INVENTOR.
VICTOR BROWN

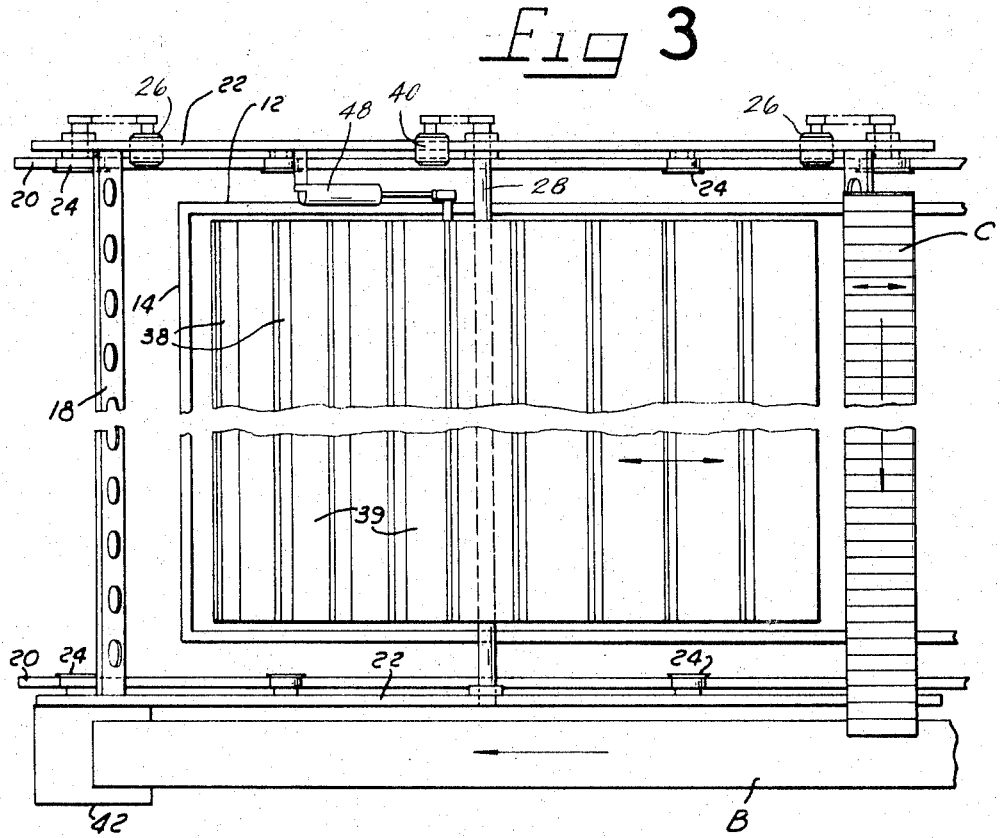
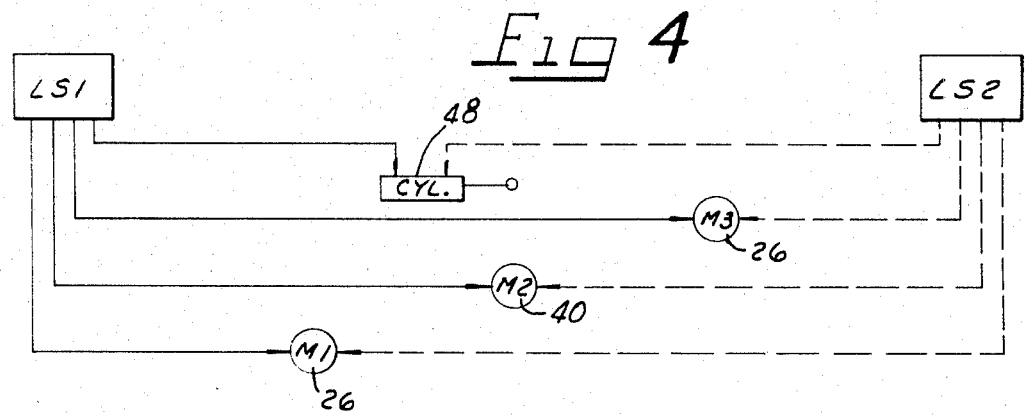

United States Patent Office 3,438,740
Patented Apr. 15, 1969

3,438,740
COMPOSTING CONVEYOR
Victor Brown, Elmhurst, Ill., assignor to New Life Foundation, a corporation of Illinois
Filed Feb. 1, 1966, Ser. No. 524,344
Int. Cl. C05f 9/02, 9/04
U.S. Cl. 23—259.1       5 Claims

ABSTRACT OF THE DISCLOSURE

A compositing conveyor movable along an elongated tank for periodically agitating organic material placed in the tank for aerobic digestion. The conveyor is inclined and operable in a gap of the material to progressively elevate the material adjacent the lower portion of the conveyor to a position above the level of the material in the tank and discharge it back into the tank, the conveyor being reversible as to direction of travel relative to the tank whereby it may traverse the tank in alternately opposite directions. The conveyor is pivoted intermediate its ends to a wheeled frame for inclination in one direction when the frame moves longitudinally of the tank in one direction and for inclination in an opposite direction when the conveyor moves longitudinally of the tank in the opposite direction. Reversible means is provided for simultaneously traversing the wheeled frame along the tank, actuating the inclined conveyor and effecting its inclination, control means being provided adjacent each end of the tank and operable by the wheeled frame approaching such control means for effecting simultaneous reversal of the wheeled frame, and the inclination of the conveyor. A second conveyor laterally of the tank travels along with the inclined conveyor to receive material from it and discharge it beyond one side of the tank after the organic material has been aerobically digested. The control means includes limit switches at the ends of the tank and the inclination of the conveyor is effected by a hydraulic unit responsive to the limit switches.

---

This invention relates to composting apparatus and particularly to one which is designed for complete aerobic digestion of waste organic material such as garbage, the apparatus being of batch-type and capable of operation throughout the entire range of mesophilic and thermophilic digestion as well as cooling out and partial drying according to the method for the production of organic soil conditioners set forth in the copending application of Walker & Redd, Ser. No. 211,372, filed July 20, 1962, and now abandoned, the present apparatus being a variation of that shown in my copending application, Ser. No. 357,-423, filed Apr. 6, 1964, now issued as Patent No. 3,294,-491.

One object of the invention is to provide an apparatus which is comparatively simple and inexpensive to construct and operate.

Another object is to provide an apparatus comprising an elongated tank and an inclined composting conveyor wherein the conveyor is designed to travel longitudinally of the tank and in alternately opposite directions for progressively elevating the organic material in the tank to a position above the level of the material for aeration and mixing whereupon it is discharged back into the tank behind the traveling inclined conveyor, the composting conveyor thus serving as an agitator for the organic material.

Still another object is to provide an inclined composting conveyor in the form of a wheeled frame which travels along tracks at the sides of the tank and which conveyor on the front side thereof elevates the material, and discharges it to the rear of the conveyor as determined by the direction of travel longitudinally of the tank, the inclined composting conveyor operating in a gap of the organic material and effectively aerating the same in a progressive manner which between passes of the conveyor leaves the material undisturbed for further aerobic digestion processes to proceed.

A further object is to provide means for removing the organic material from the tank comprising a lateral conveyor which travels with the inclined composting conveyor to receive the material therefrom and discharge it to one side of the tank where a tank-side conveyor extends longitudinally of the tank so as to receive the material regardless of the position of the composting conveyor and the lateral conveyor with respect to the tank, the tank-side conveyor then conveying the material beyond the end of the tank.

With these and other objects in view, my invention consists in the construction, arrangement and combination of the various parts of my composting conveyor, whereby the objects above contemplated are attained, as hereinafter more fully set forth, pointed out in my claims and illustrated in detail on the accompanying drawing, wherein:

FIG. 3 is a plan view of the apparatus; and

FIG. 4 is an electro-diagrammatic view of components which effect automatic operation of the composting conveyor once it is energized for operation.

Figure 1:
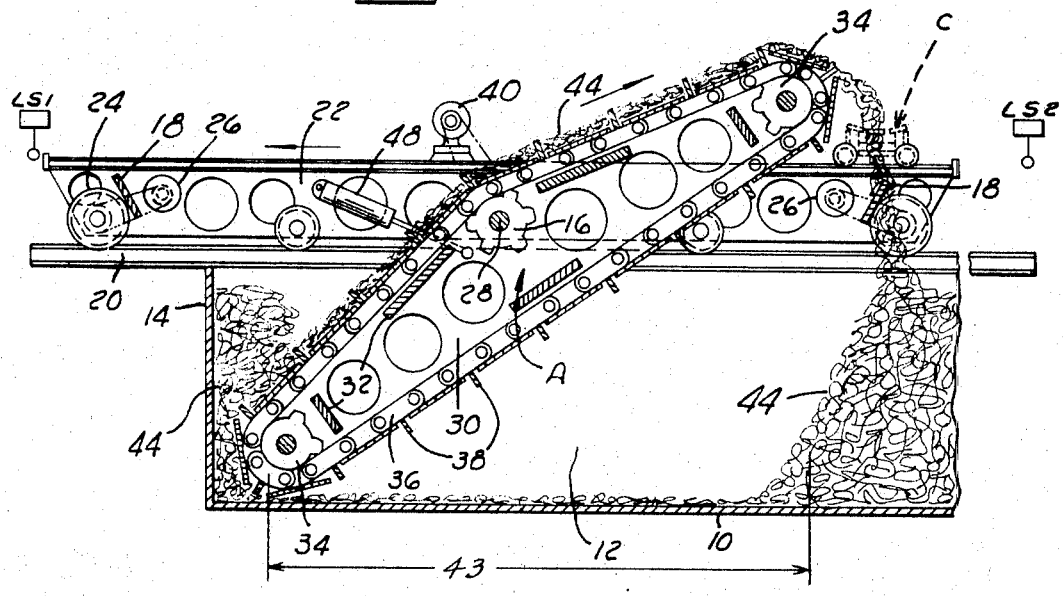
FIG. 1 is a vertical sectional view through a composting conveyor embodying my invention.

On the accompanying drawings I have used the reference numeral 10 to indicate the bottom of an elongated tank, 12 the sides thereof and 14 the ends thereof. The tank 10, 12, 14 may be formed of metal, concrete, or any other suitable material in a size such as 12 feet wide and 120 feet long. The size, of course, may be varied to suit requirements. The tank may be supported in any suitable manner and on a suitable foundation as shown in my copending application above referred to. The details thereof are not illustrated in the present drawings.

Along the sides 12 of the tank 10, 12, 14, I provide a pair of rails 20. An agitator A in the form of an inclined conveyor is carried by side frames 22 connected together by suitable cross members 18. The frame work 18, 22 is supported by wheels 24 adapted to travel on the rails 20. In FIG. 1 a pair of motors 26 are provided to drive the end wheels 24 of the side frames 22 and the motors are reversible.

The frame members 22 have a conveyor drive shaft 28 journaled therein, and conveyor side frames 20 are pivoted thereon and provided with cross members 32 to complete the frame work for the conveyor. Drive sprockets 16 are carried by the conveyor drive shaft 28 and cooperate with idler sprockets 34 to drive conveyor chains 36 which carry elevator blades 38 terminating relatively close to the walls 12 so that the blades substantially span the tank laterally for elevating the organic material 44 therein as will hereinafter appear. Such material has been previously reduced to small particle size and water has been mixed with it to form a finely ground, 60% moist mixture.

The inclined conveyor 30, 36, 38 is symmetrical for operation in either direction. The conveyor operates in a gap in the material 44 as illustrated in FIG. 1 and may be driven by a reversible motor 40. Both motors 26 and the motor 40 are provided with suitable step down gearing as the speed of rotation for the wheels 24 and the chains 36 is necessarily much slower than the rotation of the motor shafts. The step down gearing also preferably includes a suitable means for changing the speed of rotation of the output shaft to meet varying requirements which, of course, is well-known in the art.

Figure 2:
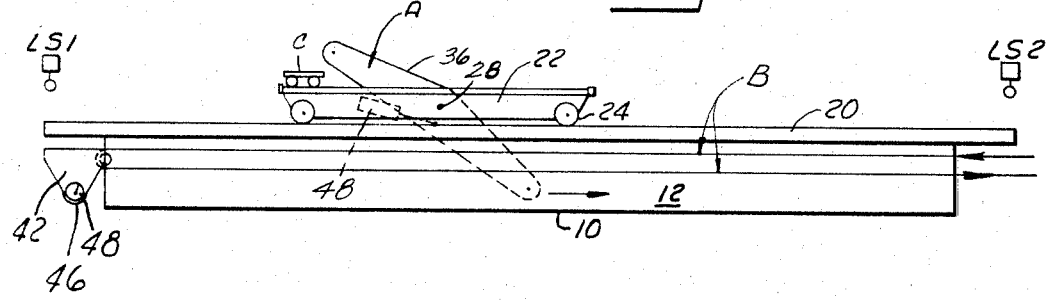
FIG. 2 is a diagrammatic side elevation thereof.

The agitator A is adapted to travel toward the left as shown in FIG. 1 at which time the composting conveyor is inclined upwardly toward the right and the sprockets 16, 34 and 34 travel clockwise thus elevating the organic material 44 at the left and carrying it toward the right where it is fed back into the tank as illustrated. Similarly, when the conveyor travels toward the right it is at a reverse inclination as shown in FIG. 2 and the sprockets will rotate counterclockwise and pick up material on the right side which is now the front side and discharge it at the left or rear side behind the agitator. The agitator is operated to traverse the tank in one direction, and when it arrives at one end of the tank, it is reversed so as to travel in the opposite direction. It is again reversed at the end of such travel thereby traveling back and forth throughout the length of the tank in a continuous manner. The organic material 44 is thus progressively agitated and elevated for evenly distributing the bacteria and periodically aerating each portion of the material during the digesting process.

In this connection it may be mentioned that there are two phases of digestion, a first phase of mesophilic digestion in the range of about 110° F. for a twenty-four hour period then thermophilic digestion at about 140° F. for a further 24 hour period followed by a sterilization period of approximately 165° F. for a 48 hour period. After that cooling out and partial drying may be accomplished in the apparatus disclosed, or the hot material may be removed for cooling out and drying elsewhere if desired.

In a tank and agitator apparatus of the kind described, the digesting process is helped by the introduction of air at the bottom of the tank and by the addition of water at the gap 43 in the material as disclosed in my copending application.

After the digesting period, and the cooling out and drying period if practiced in the tank, the digested material 44 may be removed therefrom by positioning a cross conveyor C as shown dotted in FIG. 1 and it may be connected with the side frames 22 to travel with them so that as the agitator traverses the tank from right to left the conveyor C will receive the material and may, for example, discharge it onto a conveyor B shown in FIGS. 2 and 3 adjacent the near side 12 of the tank. The conveyor B may discharge into a hopper 42 of a take-away conveyor 46 which may be of screw type, the screw being shown at 48. Alternatively the material from the conveyor C may be discharged directly into a grinder.

In the operation of an apparatus of the kind disclosed the various phases of aerobic digestion, etc., may be automatically programmed or manually controlled as desired. In either event, it is desirable to have limit switches such as LS1 and LS2 to automatically reverse the travel of the agitator A along the tracks 20 and the direction of operation of the conveyor chain 36 for back-and-forth operation of the agitator in a continuous manner. This also includes reversal of the inclination of the elevator 30, 36, 38 (FIG. 2 showing it reversed relative to FIG. 1) as by means of a pneumatic or hydraulic cylinder 48 as diagrammed in FIG. 4. In FIG. 1, the agitator A is travelling toward the left and when it engages the limit switch LS1 the motors 26, 26 and 40 and the cylinder 48 will be actuated in one direction by suitable electric circuitry and solenoid valves for the control of compressed air or hydraulic fluid under pressure in a manner well known in the art as indicated by solid line arrows. When the agitator A then travels toward the right as in FIG. 2 it will eventually trip the limit switch LS2 for reversing the motors and the piston in the cylinder 48 as indicated by dotted arrows thus automatically causing the back-and-forth travel of the agitator once the motors and the cylinder are properly energized.

From the foregoing specification, it will be obvious that my apparatus is comparatively simple in construction and operation and will efficiently agitate a batch of organic material throughout the various phases of digestion, sterilization and cooling out. The agitator is so designed that in cooperation with the conveyor C, the material may be removed from the tank after the processing has been completed. The next batch of material may be brought in on the conveyor B from which it may be removed by a suitable tripper conveyor (not shown) and deposited throughout the length of the tank 10, 12, 14. Thereupon the agitator can be energized for operation on the new batch of material. Upon completion of the digesting operation, the agitator, in cooperation with the conveyor C and the conveyor B is operated to remove one batch of organic material and deposit another batch in the tank.

Some changes may be made in the construction and arrangement of the parts of my composting conveyor without departing from the real spirit and purpose of my invention, and it is my intention to cover by my claims any modified forms of structure or use of mechanical equivalents which may reasonably be included within their scope.

I claim as my invention:

1. In a composting conveyor, an elongated tank adapted to be charged with organic material for aerobic digestion, and means for periodically agitating said organic material comprising an inclined conveyor which is bodily movable longitudinally of said tank and operable in a gap of the material to progressively elevate the material adjacent the lower portion of said conveyor to a position above the level of the material in said tank and discharge it into said tank in a position below the upper end of said inclined conveyor, said inclined conveyor being reversible as to direction of travel relative to said tank whereby it may traverse said tank in alternately opposite directions, a wheel frame, said tank having tracks along its side edges for supporting said wheeled frame, said inclined conveyor being pivoted intermediate its ends to said wheeled frame for inclination in one direction when the conveyor moves longitudinally of the tank in one direction and in an opposite direction when the conveyor moves longitudinally of the tank in the opposite direction, means for simultaneously traversing said wheeled frame along said tracks, actuating said inclined conveyor and effecting inclination thereof, said last means being reversible, and control means adjacent each end of said tank, operable by said wheeled frame approaching the same for effecting simultaneous reversal of said wheeled frame, reversal of said conveyor and reversal of the inclination of said conveyor.

2. A composting conveyor in accordance with claim 1 wherein means are provided for removing digested organic material from said tank comprising a second conveyor laterally of said tank and adapted to travel longitudinally of said tank along with said inclined conveyor to receive material therefrom and discharge it beyond one side of said tank.

3. A composting conveyor in accordance with claim 2 wherein a tank-side conveyor is provided to receive the material from said lateral conveyor.

4. A composting conveyor in accordance with claim 1 wherein said means for traversing said wheeled frame along said tracks, actuating said inclined conveyor and effecting inclination thereof is electrically actuated, and said control means is a pair of limit switches, one to energize said last mentioned means in one direction by approach of said wheeled frame thereto when traveling in one direction, and the other to energize said last mentioned means in the opposite direction by approach of said wheeled frame thereto when traveling in the opposite direction.

5. A composting conveyor in accordance with claim 4 wherein the means for effecting inclination of said conveyor includes a hydraulic unit alternately actuated in opposite directions responsive to said pair of limit switches.

References Cited

UNITED STATES PATENTS 3,294,491  12/1966  Brown _____ 23—259.1
3,051,560  8/1962  Barboza _____ 23—284
516,857  3/1894  Bailey _____ 198—119

FOREIGN PATENTS 521,939  6/1940  Great Britain.
543,865  3/1942  Great Britain.

JAMES H. TAYMAN, Jr., *Primary Examiner.*

U.S. Cl. X.R.

23—284; 71—8, 9; 198—119; 259—114